US009488780B2

United States Patent
Hugonnot et al.

(10) Patent No.: US 9,488,780 B2
(45) Date of Patent: Nov. 8, 2016

(54) DEVICE FOR CONVERTING THE TRANSVERSE SPATIAL PROFILE OF INTENSITY OF A LIGHT BEAM, PREFERABLY USING A MICROSTRUCTURED OPTICAL FIBRE

(71) Applicants: COMMISSARIAT A L'ENERGIE ATOMIQUE ET AUX ENE ALT, Paris (FR); UNIVERSIT LILLE 1 SCIENCES ET TECHNOLOGIES, Villeneuve D'Ascq Cedex (FR); CENTRE NATIONAL DE LA RECHERCHE SCIENTIFQUE, Paris (FR)

(72) Inventors: Emmanuel Hugonnot, Talence (FR); Arnaud Mussot, Hellemmes (FR); Yves Quiquempois, Marquette Lez Lille (FR); Geraud Bouwmans, Villeneuve D'Ascq Cedex (FR); Laurent Bigot, Hellemmes (FR); Constance Valentin, Croix (FR)

(73) Assignees: Commissariat à l'énergie atomique et aux énergies alternatives, Paris (FR); UNIVERSITE LILLE 1 SCIENCES ET TECHNOLOGIES, Villeneuve d'Ascq (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 14/383,822

(22) PCT Filed: Mar. 5, 2013

(86) PCT No.: PCT/EP2013/054341
§ 371 (c)(1),
(2) Date: Sep. 8, 2014

(87) PCT Pub. No.: WO2013/131877
PCT Pub. Date: Sep. 12, 2013

(65) Prior Publication Data
US 2015/0139595 A1  May 21, 2015

(30) Foreign Application Priority Data

Mar. 8, 2012 (FR) ..................................... 12 52098

(51) Int. Cl.
*G02B 6/032* (2006.01)
*G02B 6/14* (2006.01)
(Continued)

(52) U.S. Cl.
CPC ............... *G02B 6/14* (2013.01); *B23K 26/064* (2015.10); *B23K 26/073* (2013.01);
(Continued)

(58) Field of Classification Search
CPC ..................................................... G02F 1/0115
See application file for complete search history.

(56) References Cited

U.S. PATENT DOCUMENTS 5,835,655 A * 11/1998 Liu ..................... G02B 6/02014
385/123
6,275,636 B1  8/2001 Liu et al.
(Continued)

FOREIGN PATENT DOCUMENTS

EP  0 724 171 A2  7/1996
EP  0 724 171 A3  7/1996

OTHER PUBLICATIONS

Search Report issued Oct. 25, 2012 in French Patent Application No. FR 1252098 FA 761787 (with English translation of category of cited documents.
(Continued)

*Primary Examiner* — Rhonda Peace
(74) *Attorney, Agent, or Firm* — Oblon, McClelland, Maier & Neustadt, L.L.P.

(57) ABSTRACT

A device for converting transverse spatial profile of intensity of a light beam, using a microstructured optical fiber. Transverse dimensions of the fiber vary longitudinally and both its ends have opto-geometrical parameters such that at the wavelength of the beam the fiber has a fundamental mode having two different profile shapes at its two ends. Thus by introducing the beam with one of the profiles through one of the two ends, the beam emerges through the other end with the other profile, whose shape is different from that of the profile of the introduced beam.

9 Claims, 3 Drawing Sheets

(51) Int. Cl.
  G02B 6/036    (2006.01)
  B23K 26/073   (2006.01)
  B23K 26/20    (2014.01)
  G02B 27/09    (2006.01)
  H01S 3/067    (2006.01)

(52) U.S. Cl.
  CPC .......... B23K 26/0734 (2013.01); B23K 26/20 (2013.01); G02B 6/03611 (2013.01); G02B 6/03622 (2013.01); G02B 27/09 (2013.01); H01S 3/06741 (2013.01); H01S 3/06745 (2013.01)

(56) References Cited

U.S. PATENT DOCUMENTS

| | | | | |
|---|---|---|---|---|
| 6,324,326 | B1* | 11/2001 | Dejneka | G02B 6/1228 359/341.1 |
| 6,493,495 | B1 | 12/2002 | Liu et al. | |
| 6,563,981 | B2* | 5/2003 | Weisberg | G02B 6/023 385/126 |
| 6,728,439 | B2* | 4/2004 | Weisberg | G02B 6/023 385/126 |
| 8,643,940 | B2* | 2/2014 | Kudlinski | G02F 1/353 359/326 |
| 8,977,087 | B2* | 3/2015 | Jacobsen | G02B 6/02376 385/43 |
| 9,244,219 | B2* | 1/2016 | Hugonnot | G02B 6/02333 |
| 2004/0247272 | A1 | 12/2004 | Dawson et al. | |
| 2005/0041924 | A1* | 2/2005 | Bouadma | B82Y 20/00 385/43 |
| 2014/0044143 | A1* | 2/2014 | Clarkson | G02B 27/0927 372/72 |
| 2014/0233900 | A1* | 8/2014 | Hugonnot | G02B 6/02333 385/123 |

OTHER PUBLICATIONS

Jay W. Dawson, et al., "Large flattened mode optical fiber for high output energy pulsed fiber lasers", paper CWD5, CLEO, 2003, 2 pages.

Jay W. Dawson, et al., "Large flattened mode optical fiber for reduction of non-linear effects in optical fiber lasers", Proceedings of SPIE, fiber Lasers: Technology, Systems and Applications, vol. 5335, 2004, pp. 132-139.

Chun-can Wang, et al., "Photonic crystal fiber with a flattened fundamental mode for the fiber lasers", Optics Communications 282, 2009, pp. 2232-2235.

Chun-can Wang, et al., "Single mode operations in the large flattened mode optical fiber lasers and amplifiers", Journal of Optics A: Pure and Applied Optics, 11, 065402, 2009, 5pages.

Kunimasa Saitoh, et al., "Endlessly single-mode holey fibers: the influence of core design", Optics Express 10833, vol. 13, No. 26, 2005, 7 pages.

Philip St. J. Russell, "Photonic-Crystal Fibers", Journal of Lightwave Technology, vol. 24, No. 12, Dec. 2006, pp. 4729-4749.

D. Lin et al, "Temporally and spatially shaped fully-fiberized ytterbium-doped pulsed MOPA", The Laser Physics Letter, 8, No. 10, 2011, pp. 747-753.

J.D. Love, et. al, "Tapered single-mode fibres and devices .I. Adiabaticity criteria", IEEE Proceedings-J Optoelectronics, vol. 138, Oct. 1991, pp. 343-354.

International Search Report issued Apr. 26, 2013, in PCT/EP13/054341 filed Mar. 5, 2013.

Ghatak, et al., "Design of Waveguide Refractive Index Profile to Obtain Flat Modal Field", SPIE Proceedings, vol. 3666, XP-002328355, Jan. 1998, pp. 40-44.

Wang, et al., "Photonic crystal fiber with a flattened fundamental mode for the fiber lasers", Optics communications, vol. 282, Elsevier, XP026038745, Jun. 2009, 4 pages.

Elkin, et al., "Modeling of Large Flattened Mode Area Fiber Lasers", Laser Physics, vol. 20, No. 2, XP007921188, Jan. 2010, pp. 304-310.

International Preliminary Report on Patentability issued Sep. 18, 2014 in PCT/EP2013/054341 (English Translation only).

Michael Wood et al., "Compact Cantilever Couplers for Low-loss Fiber Coupling to Silicon Photonic Integrated Circuits", Optics Express, vol. 20, No. 1, Jan. 2, 2012, pp. 164-172.

\* cited by examiner

DEVICE FOR CONVERTING THE TRANSVERSE SPATIAL PROFILE OF INTENSITY OF A LIGHT BEAM, PREFERABLY USING A MICROSTRUCTURED OPTICAL FIBRE

TECHNICAL FIELD

This invention relates to a device for converting the transverse spatial profile of the intensity of a light beam.

It finds applications in the field of fibre laser systems and in particular allows the lossless transformation of a Gaussian beam into a flattened (so-called 'top hat') or into a ring-shaped beam, for applications in laser micro-machining, such as marking and welding, or for medical applications which require interaction between the light and biological tissues.

STATE OF THE PRIOR ART

The transformation of the intensity profile of a laser beam from a Gaussian shape into any other shape is generally carried out in free space, either by modifying the amplitude using systems of masks or diaphragms, in accordance with the beam aperturing technique, or by modulating the spatial phase using diffractive or refractive components, in accordance with the field-mapping technique.

In the case of non-coherent beams, homogenising components which form beam integrators are used.

In order to benefit from the advantages offered by optical fibres in terms of compactness and ease of alignment, techniques have been developed for homogenising beams using highly multi-modal optical fibres.

Flattened fundamental mode optical fibres are also known. On this subject reference should be made to documents [1] to [4] which, like the other documents cited later, are listed at the end of this description. In this case the spatial beam shaping is achieved by excitation of the flattened fundamental mode after the incident beam is introduced into the fibre (see document [5]).

Transformations carried out in free space, which are based on amplitude modification, result in high losses. Those based on spatial phase modulation result in low losses but are extremely sensitive to the alignment and are costly.

The use of devices with components for homogenisation, whether in free space or in integrated or fibre-optics, result in low spatial coherence of the beams at the outlet from these devices.

The use of a fibre with a flattened fundamental mode allows spatial beam shapes to be obtained which are robust and compact, and with no alignment. Nevertheless, the fact that the fundamental mode of the fibre does not have the same shape as the incident beam results in losses on introduction. Furthermore, since it is extremely difficult to produce an endlessly single mode fibre (see document [6]), the fibre used is in fact very slightly multi-modal, which means that the shape at emergence is dependent on the conditions of introduction.

No solution currently exists, therefore, for transforming the intensity profile of a laser beam from a Gaussian shape to a flattened shape or to a ring shape (or vice versa) which is compact, robust and of low-cost.

PRESENTATION OF THE INVENTION

The aim of the present invention is to overcome the above drawbacks.

In precise terms its object is a device for converting the transverse spatial profile of the intensity of a light beam which has a given wavelength, so that it changes from a first profile having a first shape to a second profile having a second shape which is different from the first shape, characterised in that it comprises an optical fibre which has first and second ends and which comprises a core, a ring which surrounds the core and whose refractive index is greater than that of the core, and an optical cladding which surrounds the ring and whose refractive index is less than that of the core, and in that the transverse dimensions of the optical fibre vary longitudinally and the first and second ends have opto-geometrical parameters designed in such a manner that at the given wavelength the optical fibre has a fundamental mode which has the first profile at the first end and the second profile at the second end, such that when the light beam which has the first profile is introduced through the first end of the optical fibre, it emerges through the second end with the second profile, whose shape is different from that of the first profile.

According to a preferred embodiment of the device according to the invention, the optical fibre is a microstructured or photonic crystal fibre.

According to one specific embodiment of the invention, the first profile is one of the three profiles in the set made up of a quasi-Gaussian profile, a flattened profile and a ring-shaped profile, and the second profile is one of the other two profiles in the set.

In the invention the transverse dimensions of the optical fibre may remain substantially constant over the entire length of the optical fibre, except at at least one of the first and second ends.

Furthermore, in the invention the optical fibre may be selected from amongst amplifying optical fibres and non-amplifying optical fibres.

According to one specific embodiment, the device according to the invention moreover comprises an auxiliary optical fibre which is optically coupled to one of the first and second ends.

According to another specific embodiment, the device moreover comprises two auxiliary optical fibres which are respectively optically coupled to the first and to the second ends.

Each auxiliary optical fibre may be chosen from amongst amplifying fibres and non-amplifying fibres.

BRIEF DESCRIPTION OF THE DRAWINGS

The present invention will be better understood on reading the description of examples of manufacture given hereafter, which are given for purely informative purposes and which are not in any way restrictive, whilst referring to the appended drawings wherein.

DETAILED DESCRIPTION OF SPECIFIC EMBODIMENTS

Figure 1A:
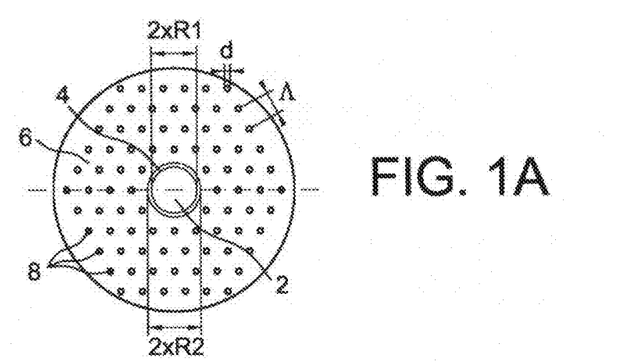
FIG. 1A is a schematic transverse sectional view of an example of microstructured optical fibre.
Figure 1B:
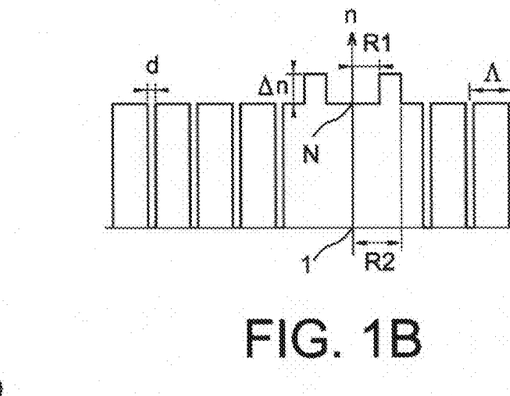
FIG. 1B shows the radial profile of the refractive index for this example of fibre.

FIG. 1A is a diagrammatic transverse section view of an example of microstructured optical fibre. FIG. 1B shows the index profile of the fibre shown in FIG. 1A along a horizontal section, that is, the variations of the refractive index n as a function of the radius R (radial profile).

The advantage of microstructuring is in particular to ensure quasi-single mode behaviour, even for a core whose dimensions are large relative to the wavelength λ of the light being propagated in the fibre.

The fibre shown in FIG. 1A comprises:
a central part made up of a core 2 whose refractive index has a value N, and a ring 4 whose refractive index is equal to N+Δn where Δn is strictly positive, and
an optical cladding 6 surrounding the ring 4, comprising air inclusions and having a mean refractive index $n_{FSM}$ which is less than the refractive index N of the core 2 (air, however, is only one specific case and in more general terms inclusions can be used whose refractive index is less than that of the core).

More specifically, in the example shown in FIG. 1A, the optical cladding 6 comprises longitudinal holes 8 (air inclusions) which are parallel to the axis of the fibre. The cladding 6 is made up of the same material as the core but due to the existence of the holes the index $n_{FSM}$ is less than N.

In the example, the core 2 is made of pure or doped silica; the ring 4 is of a sub-micron size and is made of silica lightly doped with germanium; the internal radius of the ring is shown as R1, its external radius R2 and its thickness as ΔR (ΔR=R2−R1), and the cladding 6 is of the air-silica type. It should be noted that the diameter of the core 2 is equal to 2R1.

The parameters of the microstructuring are the diameter d of the air-holes 8 and the spacing Λ of the latter.

It should be specified that the index $n_{FSM}$ is dependent on the opto-geometrical parameters λ, Λ and d/Λ of the fibre.

As can be seen in FIG. 1A, in order to form the core 2 surrounded by the ring 4, the central hole or capillary is replaced by solid material forming the core and the six holes or capillaries corresponding to the first ring of holes are replaced by this solid material. This latter is made of silica which is surrounded by the ring made of germanium-doped silica, and further surrounded by silica before encountering the second ring of holes. The number of missing holes is therefore equal to 7, and the fibre is said to have a default of 7.

This geometry makes it possible to increase the size of the fundamental mode without the pitch Λ of the network of holes being increased excessively. It should be recalled that for such a geometry the ratio d/Λ must be equal to 0.047 to obtain a single mode of propagation, irrespective of the value of λ/Λ (see document [6]).

The ratio d/Λ must be as small as possible (typically d/Λ less than 0.25) so that the number of guided modes is as small as possible.

The external radius R2 of the ring 4 is governed by the manufacture of the fibre. Because of the positioning of the capillaries used to form the cladding 6, a minimum separation which is equal to Λ/2 is required between the external cylinder, of radius R2 and which forms the boundary of the ring 4, and the centre of the first air hole encountered, which corresponds to a maximum external radius equal to $$(2\sqrt{3} - 1)\frac{\Lambda}{2}.$$

Appropriate selection of the various parameters makes it possible to obtain a fundamental mode with a flattened intensity profile.

This flattened mode is obtained when its effective index is equal to that of the core. The flatness of the transverse intensity profile of the fundamental mode is optimised for the pair (Δn; ΔR). An example of optimisation for d/Λ=0.25 is given in FIG. 1C. It will be recalled that Δn (index step or index contrast) is the difference between the refractive index of the ring 4 and that of the core 2, and that ΔR represents the thickness of the ring.

Figure 1C:
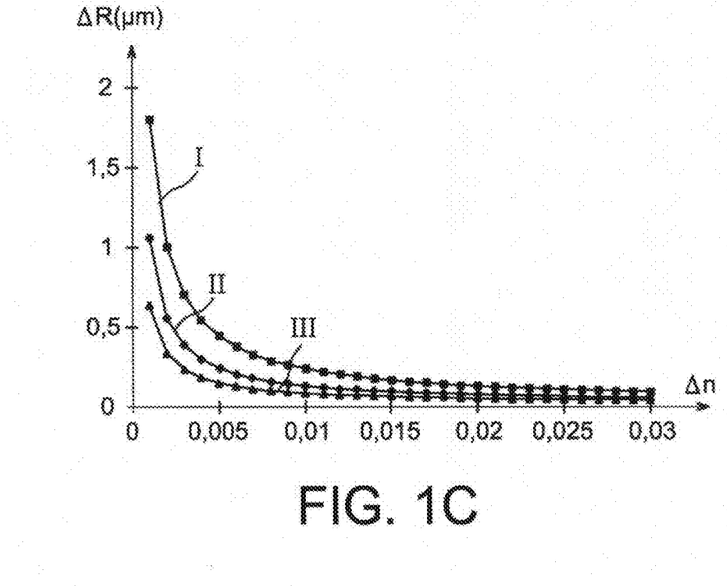
FIG. 1C shows the variations of the thickness $\Delta R$ of the ring which makes it possible to achieve a flattened profile for the optical fibre in FIG. 1A, as a function of the refractive index contrast $\Delta n$, for a default of 7 and for various values of the spacing $\Lambda$ between each hole in the fibre.

More specifically, FIG. 1C gives the thickness of the ring which allows a flattened profile to be obtained, as a function of the index contrast, for a default of 7, for several separations Λ between the air-holes, namely Λ=8.5 μm (curve I), Λ=17 μm (curve II) and Λ=30 μm (curve III) and for d/Λ=0.25.

The index contrasts, Δn, that can be read from FIG. 1C can be achieved using the OVD technique i.e. the outside vapour deposition technique, either by the deposition of silica doped with germanium around a bar of pure silica, or by deposition of pure silica around a core doped with fluorine. Current manufacturing technology allows the dimensions of the ring to be controlled to within a few percent and allows an index contrast to the nearest $5 \times 10^{-4}$ to be obtained.

It should be noted that the deposits of germanium around the silica or of the pure silica around a fluorine doped core are only possible examples.

The reasoning used to establish the design dimensions of a flattened fundamental mode optical fibre will be detailed hereafter:
the wavelength λ of the light being guided in the fibre is chosen (for example λ=1 μm or λ=1.55 μm),
the number of capillaries replaced by a solid core in the holey structure is chosen (for example a default of 7),
the ratio d/Λ is chosen (for example d/Λ=0.12),
the level of doping T of the core by rare earths (T≥0) is chosen. This determines the core index N (see FIG. 5), and
the separation between the air holes, Λ, is chosen. This determines the diameter d of the holes, the external radius R2 and the effective refractive index or mean refractive index $n_{FSM}$ of the optical cladding.

There exists a relationship between the thickness ΔR of the ring and the index contrast Δn. This relationship is as follows:

$$\Delta R = \frac{\alpha}{(\Delta n)^B}. \tag{1}$$

The values of the parameters α (in μm) and β are dependent on the above chosen parameters (wavelength λ, default value, ratio d/Λ, value N of the optical index of the core resulting from a possible doping, the separation Λ between the air-holes).

For example, when the core is made of non-doped silica, α is given by the following formula:

$$\alpha = 2.489 \times 10^{-2} (d/\Lambda)^{0.25} \lambda^2 / \Lambda$$

where α is in micrometers when d, Λ and λ are also in micrometers; and β is equal to 1.

It can be stated that, in general terms: $\Delta n > 10^{-3}$, $5 \times 10^{-4}$ μm ≤ α ≤ $5 \times 10^{-2}$ μm, and $0.5 \leq \beta 3 \leq 1.5$.

When a flattened fundamental mode fibre is used, more exactly a fibre which has a fundamental mode whose intensity profile is flattened, spatial shaping is achieved by means of the excitation of this flattened fundamental mode resulting from the introduction of the incident beam into the fibre (see document [5]).

However, the fact that the fundamental mode of the fibre does not have the same shape as the incident beam results in losses on introduction. Moreover, from a practical point of view, there are difficulties in making a fibre of large effective area which is endlessly single mode (see document [6]). Several higher-order modes may therefore coexist with the fundamental mode.

The introduction of a laser beam which typically has a Gaussian intensity profile in such a fibre, in free space or by means of an optical fibre, therefore excites not only the fundamental mode but also the higher-order modes. The spatial form of the output mode therefore depends on the conditions of introduction and on the constraints of the fibre.

Figure 2A:
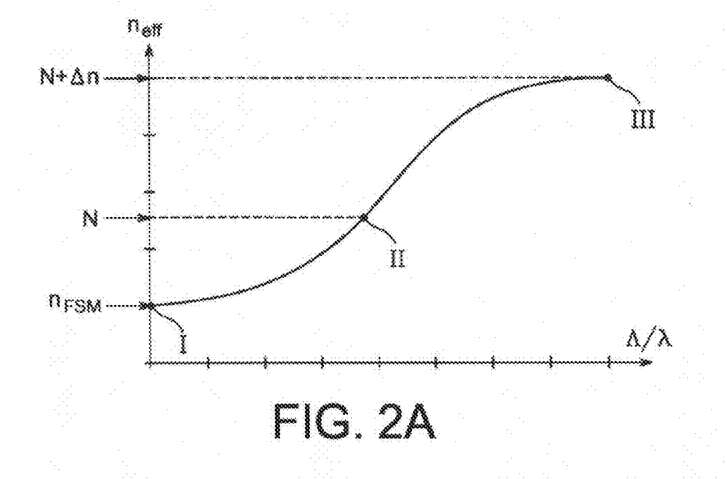
FIG. 2A shows the schematic change in the effective index in a microstructured optical fibre, as a function of the ratio $\Lambda/\lambda$, where $\lambda$ represents the wavelength of the light that the fibre is designed to guide, FIGS. 2B to 2D respectively illustrate a Gaussian mode, a flattened mode and a ring-shaped mode that can be obtained for the microstructure fibre by the appropriate selection of the ratio Λ/λ.

If the structure represented in FIGS. 1A and 1B is considered, the fundamental mode has a transverse spatial form which depends on the ratio Λ/λ of the pitch of the ring of air holes to the wavelength. The behaviour is illustrated in FIG. 2A wherein is shown the trend of the change in the effective index $n_{eff}$ as a function of this ratio Λ/λ.

For small values of Λ/λ, the effective index for the mode is less than the index of the core, N. The fibre acts like a conventional step-index fibre, where the ring with the high index surrounding the core is almost not "seen" by the mode. This mode is therefore quasi-Gaussian. More specifically, the intensity distribution of the fundamental mode is quasi-Gaussian.

Figure 2B:
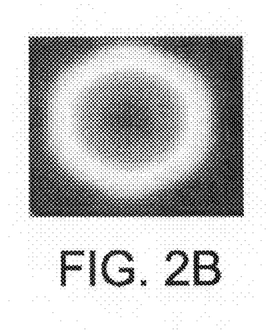

This distribution is shown in FIG. 2B for a specific value of the ratio Λ/λ, which corresponds to the case where $n_{eff}$ is close to $n_{FSM}$ (point I in FIG. 2A), that is, to the index of the fundamental mode of the infinite cladding without the core (or fundamental space-filling mode index) (see document [7]).

Figure 2C:
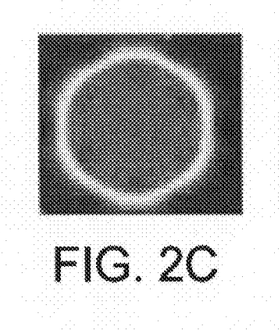

By increasing the value of Λ/λ, the importance of the ring becomes greater and greater. This is expressed as a deformation of the Gaussian-shaped mode towards a flattened mode. When the effective index $n_{eff}$ is close to the index N of the core (point II in FIG. 2A), the flattest possible mode is obtained. The corresponding distribution of the intensity of the fundamental mode is shown in FIG. 2C.

By further increasing the value of Λ/λ, the effective index $n_{eff}$ becomes much greater than that of the core, which prevents modified guidance by internal reflection within the core. This is why in this case the light is primarily guided in the ring, which has the highest index.

Figure 2D:
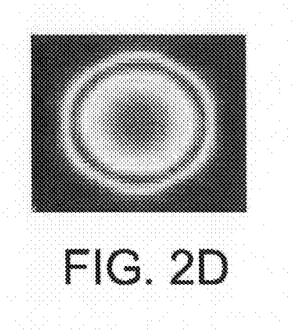

A ring-shaped mode is therefore obtained. More specifically, the intensity distribution of the fundamental mode is ring-shaped. This distribution is represented in FIG. 2D for a specific value of the ratio Λ/λ, which corresponds to the case where $n_{eff}$ is close to N+Δn, that is to the index of the ring (point III in FIG. 2A).

By optimising the value of the ratio Λ/λ a flattened mode around the desired wavelength can be successfully obtained.

Thus for an optical fibre for which the pitch of the holes Λ is constant along the length of this fibre, the spatial distribution of the intensity of the fundamental mode changes from a Gaussian shape to a ring shape, passing through a flattened shaped, when the wavelength λ is gradually reduced.

Similarly, if the wavelength λ is fixed, the spatial distribution of the fundamental mode will change as a function of Λ, that is, as a function of the transverse dimension of the fibre.

This invention uses this property. In particular it proposes a tapered photonic crystal fibre, whose transverse dimensions change adiabatically in order to transform an input mode which has a Gaussian shape into a flattened mode of large diameter, whilst minimising losses.

Figure 3A:
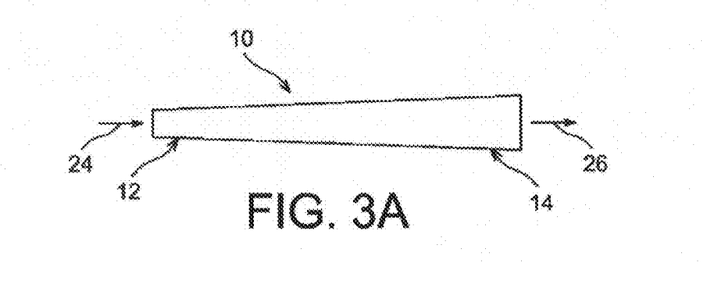
FIG. 3A is a schematic profile view of a specific embodiment of the device according to the invention which uses a tapered microstructured optical fibre.
Figure 3B:
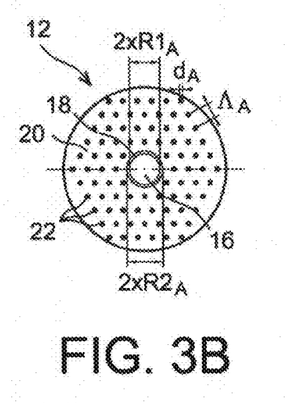
FIGS. 3B and 3C are schematic views of the two ends of the fibre shown in FIG. 3A.
Figure 3C:
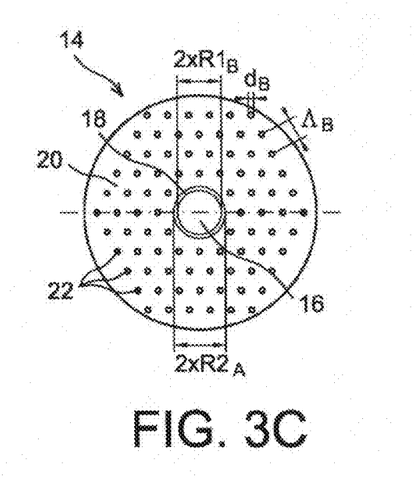

This example of the invention is shown schematically in FIGS. 3A to 3C.

FIG. 3A is a schematic profile view of a conversion device in accordance with the invention, made up of a tapered microstructured optical fibre 10. The structure of this fibre is not shown in FIG. 3A, only in FIGS. 3B and 3C which are schematic views of the ends 12 and 14 respectively of the fibre 10.

It can be seen that this is constituted like the fibre in FIG. 1A, and therefore comprises:
 a core 16,
 a ring 18 which surrounds the core and whose refractive index is greater than that of the core, and
 an optical cladding 20 which surrounds the ring 18 and which comprises longitudinal holes 22 and whose mean refractive index is less than the refractive index of the core 16.

Unlike the fibre in FIG. 1A however, since it is tapered the transverse dimensions of the fibre 10 vary longitudinally from one end to the other of this fibre 10.

This fibre 10 is designed to convert the transverse spatial profile of the intensity of an incident light beam which has a given wavelength λ: the input beam 24 introduced into the fibre 10 through the latter's end 12 has a Gaussian profile and the output beam 26 which emerges from the fibre through the end 14 of the fibre has a flattened profile.

For this purpose the ends 12 and 14 have opto-geometric parameters designed such that at the wavelength λ the fibre 10 has, at its ends 12 and 14, Gaussian and flattened fundamental modes respectively. These correspond respectively therefore to the Gaussian and flattened profiles stated above.

For a given wavelength λ the opto-geometric parameters involved are the parameters Δn, Λ, d, R1 and R2 defined above. As can be seen in FIGS. 3B and 3C however the parameters Λ, d, R1 and R2 are assigned an index A or B, depending on the end 12 or 14 of the fibre that is being considered.

It is explained hereafter how these opto-geometric parameters are chosen.

The parameters of the end 14 (refractive index B) are first of all chosen with a ratio $\Lambda_B/\lambda$ which gives a flattened fundamental mode at the wavelength λ. The transverse dimension of the fibre is then reduced in a homothetic manner until the ratio $\Lambda_A/\lambda$ gives, at end 12 (refractive index A), a Gaussian-shaped profile of the intensity at the wavelength λ.

In other words the geometry of the end 12 is homothetic with the geometry of the end 14, where: $R1_A<R1_B$, $R2_A<R2_B$, $\Lambda_A<\Lambda_B$ and $d_A<d_B$; and the ratio $\Lambda_A/\lambda$ is chosen such that the distribution of the intensity of the fundamental mode at the end 12 is of Gaussian shape.

This makes it possible to maximise the spatial overlap at this end 12, with a conventional Gaussian intensity distribution, of the type that is produced by single-mode lasers. The light beam which has this distribution can be introduced into the fibre 10 either in free space or through a step-index, single mode standard optical fibre.

The modal filtering will therefore be primarily assured by the excellent spatial overlap of the laser mode with the fibre input mode.

A lossless mode shape converter is achieved as a result of this procedure.

Naturally the conversion device that has just been described with reference to FIGS. 3A to 3C can also be used for spatial shaping of a flattened shape to a Gaussian shape: all that is required in order to recover a beam having a Gaussian profile at the end 12 is to introduce a light beam with a flattened transverse spatial intensity profile into the fibre 10 through the latter's end 14.

Figure 4:
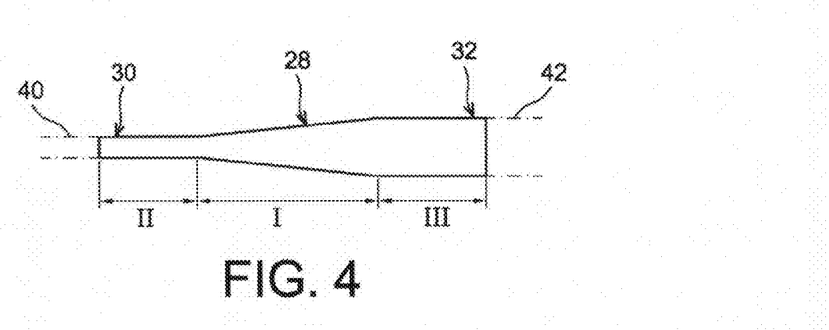
FIG. 4 is a schematic profile view of another specific embodiment of the device according to the invention.

FIG. 4 is a schematic profile view of another specific embodiment of the device according to the invention which allows the spatial shaping of a Gaussian shaped mode which has an effective area of 165 μm², to a flattened shape mode which has an effective area of 380 μm².

This device comprises a tapered microstructured optical fibre 28. The input end of the latter has the reference 30 and its output end has the reference 32.

In this example the wavelength $\lambda$ is chosen to be equal to 1053 nm, and the ratio $d/\Lambda$ of the hole size to the hole lattice pitch is constant from one end of the tapered fibre 28 to the other and is equal to 0.21. At the output end 32 of the tapered fibre 28, the size $R2_B$-$R1_B$ of the ring is equal to 0.476 μm, the index step $\Delta n$ is equal to $5.2 \times 10^{-3}$ and the pitch $\Lambda_B$ between the holes is equal to 7.13 μm. These parameters lead to a ratio $\Lambda_B/\lambda$ of 6.8 which results in a flattened profile.

At the inlet end 30 of the tapered fibre 28, the pitch $\Lambda_A$ between the holes is equal to 4.88 μm, which corresponds to a ratio $\Lambda_A/\lambda$ of 4.6 and to a Gaussian shape.

Similarly a Gaussian-shape mode to ring-shape mode converter can be obtained. Such a converter is of interest for certain laser micro-manufacturing applications, such as optical trepanning (see document [8]).

In this case, a tapered microstructured optical fibre of the sort in FIG. 3A is again used, the input end 12 of which is again designed for the Gaussian mode but whose output end is designed for the ring-shaped mode.

More specifically, at the output end the parameters are chosen with a ratio $\Lambda_B/\lambda$ which gives a ring-shaped fundamental mode at the wavelength $\lambda$. The transverse dimension of the fibre is then reduced in a homothetic manner until the ratio $\Lambda_A/\lambda$ gives, at the input end, a Gaussian-shaped intensity profile at the wavelength $\lambda$.

In other words, in order to manufacture a tapered microstructured fibre for spatial shaping of a Gaussian-shaped mode to a ring-shaped mode, the parameters at the output end are chosen such that the fundamental mode is of a ring shape at the wavelength $\lambda$.

The geometry of the input end is then homothetic with the geometry of the output end, where: $R1_A<R1_B$, $R2_A<R2_B$, $\Lambda_A<\Lambda_B$ and $d_A<d_B$; and the ratio $\Lambda_A/\lambda$ is chosen such that the distribution of the intensity of the fundamental mode at the input end is of Gaussian shape.

Naturally the conversion device thus obtained can also be used for spatial shaping of a ring-shaped mode to a Gaussian shaped mode: all that is required in order to recover a beam having a Gaussian profile at the input end (index A) is to introduce a light beam whose transverse spatial intensity profile is ring-shaped into the above mentioned output end (index B).

In the light of the above, those skilled in the art will understand that a device according to the invention for spatial shaping of a ring-shaped mode to a flattened mode and vice versa can also be made.

The device according to the invention allows mode conversion in a system which is entirely fibre-based. It involves a compact, robust and low-cost device which currently has no equivalent. It also offers the advantage of providing a single mode at the output as a result of mode selection using spatial overlap.

The transverse dimensions of the tapered microstructured optical fibre may remain substantially constant over the entire length of the fibre other than at the input end or at the output end or at both these ends.

This is schematically shown in FIG. 4 where three portions can be distinguished in the fibre 28, namely a truly tapered portion I which is flanked by portions II and III whose transverse dimensions remain substantially constant. It is specifically stated that the variation of the transverse dimensions of the fibre in the tapered portion of the latter is not necessarily linear but may take any form.

Thus a device can be conceived which is in accordance with the invention and wherein the lengths of portions I and III (or I and II respectively) are much smaller than the length of part II (or part III respectively).

The length of part I may also be much less than those of parts II and III.

Figure 5:
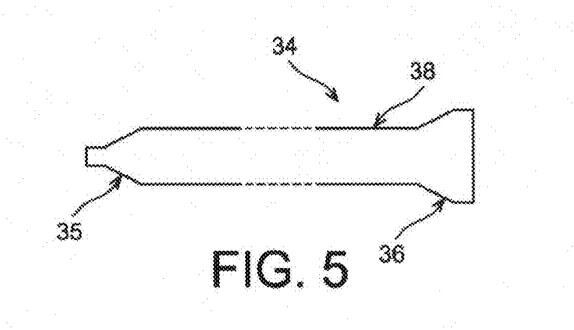
FIG. 5 is a schematic profile view of another example of the invention.

And as FIG. 5 shows, a device which is in accordance with the invention can also be conceived wherein the transverse dimensions of the microstructured fibre 34 remain constant except for at its ends 35 and 36, which are tapered. The transverse dimensions of the very short end 35 increase until they reach those of the very long central part 38 of the fibre. And the transverse dimensions of the very short end 36 increase from those of this central portion 38.

The device according to the invention can also be welded onto the end of a conventional single-mode transport fibre to convert the output mode shape in an extremely efficient and highly compact manner, unlike known devices operating in free space. This is because the effectiveness of a conversion device according to the invention depends on the "rate" at which the transverse dimension of the microstructured fibre that it comprises changes.

It is preferable for this transition (variation of the transverse dimension from one end to the other of the fibre) to be achieved in an adiabatic manner in order to prevent coupling too much energy in higher order modes and/or cladding modes.

But the transfer of energy is carried out from the fundamental mode to the mode with the closest effective index.

In order to determine, therefore, the length from which stretching occurs in an adiabatic manner, the following approximate rule can be used. This rule is based on the coupling lengths for these two modes which are likely to exchange energy, relative to the length of the tapered fibre (see document [9]):

$$\left|\frac{dr}{dz}\right| \leq \frac{r(\beta_1 - \beta_2)}{2\pi}$$

where r is the radius of the core of the fibre and $\beta_1$ and $\beta_2$ are the respective propagation constants for the two closest modes.

Too fast an increase or reduction in the diameter of the fibre would lead to excessively high losses during the mode conversion.

The above adiabaticity criterion typically leads to dimensions of the order of centimeters or even of millimeters.

FIG. 4 also illustrates the capacity, as described above, for optical coupling of the input end of a device according to the invention to an auxiliary optical fibre 40. Alternatively, the output end of the device can be optically coupled to an auxiliary optical fibre 42. But it is also possible to couple the two ends to the two fibres 40 and 42 respectively.

Moreover, the fibre 40 can be a non-amplifying fibre or, on the contrary, an amplifying fibre, and the same is true for the fibre 42.

Each of the examples in the invention given above uses a tapered microstructured optical fibre. The fabrication of such a fibre by means of welding equipment, or at the time of welding with another optical fibre, is known. In these examples the optical cladding comprises air inclusions (longitudinal holes filled with air). Air, however, is only one specific case; more generally inclusions can be used whose refractive index is greater than that of the core.

Moreover, the tapered microstructured optical fibre can be either passive (that is, non-amplifying) or active (that is, amplifying).

The invention however is not limited to the use of a tapered microstructured optical fibre. It may be implemented by means of a fibre which again comprises, between the core and the optical cladding, a ring which has a refractive index which is greater than that of the core, but which is free of longitudinal holes.

The transverse dimensions of this fibre still vary longitudinally (tapered fibre), preferably in an adiabatic manner, and the opto-geometric parameters of the fibre are still adapted at both ends of the latter in the manner explained above.

The documents cited in the present disclosure are the following:

[1] J. W. Dawson, R. Beach, I. Jovanovic, B. Wattellier, Z. Liao, S. A. Payne and C. P. J. Barty, "*Large flattened mode optical fiber for high output energy pulsed fiber lasers*", paper CWD5, CLEO 2003
[2] J. W. Dawson, R. J. Beach, S. A. Payne, M. D. Feit, C. P. J. Barty and Z. M. Liao, "*Flattened Mode Cylindrical and Ribbon Fibers and Amplifiers*", US 2004/0247272 (9 Dec. 2004)
[3] J. W. Dawson, R. Beach, I. Jovanovic, B. Wattellier, Z. Liao, S. A. Payne and C. P. J. Barty, "*Large flattened mode optical fiber for reduction of non-linear effects in optical fiber lasers*", Proc. SPIE 5335, 132-139 (2004)
[4] C. Wang, F. Zhang, Y. Lu, C. Liu, R. Geng and T. Ning, "*Photonic crystal fiber with a flattened fundamental mode for the fiber lasers*", Opt. Commun. 282, 2232-2235 (2009)
[5] C. Wang, F. Zhang, Y. Lu, C. Liu, R. Geng, T. Ning and S. Jian, "*Single mode operations in the large flattened mode optical fiber lasers and amplifiers*", J. Opt. A: Pure Appl. Opt. 11, 065402 (2009)
[6] K. Saitoh, Y. Tsuchida, M. Koshiba, et N. Asger Mortensen, "*Endlessly single-mode holey fibers: the influence of core design*", Opt. Express 13, 10833 (2005)
[7] P. St. Russell, "*Photonic-Crystal Fibers*", J. Lightwave Technol. 24, 4729-4749 (2006)
[8] D. Lin et al, "*Temporally and spatially shaped fully-fiberized ytterbium-doped pulsed MOPA*", Laser Phys. Lett., 8, 747-753 (2011)
[9] J. D. Love, W. M. Henry, W. J. Stewart, R. J. Black, S. Lacroix, F. Gontier, "*Tapered single-mode fibres and devices .I. Adiabaticity criteria*", IEEE Proceedings-J Optoelectronics 138, 343-354 (1991).
[10] EP 0724 171 which describes a segmented core single-mode optical fibre, designed to have a large effective zone for the transmission of light in order to reduce non-linear optical effects and to prevent degradation of the light signals.
[11] A. K. Gathak et al. "Design of waveguide refractive index profile to obtain flat modal field", Proc. SPIE Vol. 3666, pp 40-44, 1 Jan. 1998, which relates to the presentation of the design of a refractive index profile which makes it possible to obtain a flat modal field.

The invention claimed is:

1. A device for converting a transverse spatial profile of intensity of a light beam, which has a given wavelength, so that said transverse spatial profile changes from a first profile having a first shape to a second profile having a second shape that is different from the first shape, wherein the first profile is one of three profiles of the set made up of a quasi-Gaussian profile, a flattened profile, and a ring-shaped profile, and the second profile is one of the other two profiles in the set, the device comprising:
    a microstructured optical fiber including a first end, a second end, and a core;
    a ring that surrounds the core and has a refractive index greater than that of the core; and
    an optical cladding that surrounds the ring and has a refractive index less than that of the core,
    wherein transverse dimensions of the microstructured optical fiber vary longitudinally, and the first and second ends have opto-geometrical parameters such that at the given wavelength the microstructured optical fiber has a fundamental mode, which has the first profile at the first end and the second profile at the second end, such that when the light beam having the first profile and the first shape is introduced through the first end of the microstructured optical fiber, the light beam having the second profile and the second shape emerges from the microstructured optical fiber through the second end.

2. The device according to claim 1, wherein the microstructured optical fiber is a tapered microstructured optical fiber having transverse dimensions that change in an adiabatic manner.

3. The device as claimed claim 1, wherein the transverse dimensions of the microstructured optical fiber remain substantially constant over an entire length of the microstructured optical fiber, except at at least one of the first and second ends.

4. The device as claimed in claim 1, wherein the microstructured optical fiber is an amplifying optical fiber or a non-amplifying optical fiber.

5. The device as claimed in claim 1, further comprising an auxiliary optical fiber that is optically coupled to one of the first and second ends.

6. The device as claimed in claim 5, wherein the auxiliary optical fiber is an amplifying optical fiber or a non-amplifying optical fiber.

7. The device as claimed in claim 1, further comprising two auxiliary optical fibers that are optically coupled to the first and second ends, respectively.

8. The device as claimed in claim 7, wherein each of the two auxiliary optical fibers is an amplifying optical fiber or a non-amplifying optical fiber.

9. The device as claimed in claim 1, wherein a geometry of the first end of the microstructured optical fiber is homothetic with a geometry of the second end of the microstructured optical fiber.

* * * * *